(12) United States Patent
Hu (10) Patent No.: US 11,935,323 B2
(45) Date of Patent: Mar. 19, 2024

(54) IMAGING DEVICE AND IMAGING METHOD USING FEATURE COMPENSATION

(71) Applicant: AVerMedia Technologies, Inc., New Taipei (TW)

(72) Inventor: Chao-Tung Hu, New Taipei (TW)

(73) Assignee: AVERMEDIA TECHNOLOGIES, INC., New Taipei (TW)

( * ) Notice: Subject to any disclaimer, the term of this patent is extended or adjusted under 35 U.S.C. 154(b) by 178 days.

(21) Appl. No.: 17/533,179

(22) Filed: Nov. 23, 2021

(65) Prior Publication Data

US 2022/0165088 A1  May 26, 2022

(30) Foreign Application Priority Data

Nov. 24, 2020 (TW) .................................. 109141096

(51) Int. Cl.
*G06V 40/16* (2022.01)
*G06T 17/20* (2006.01)
*G10L 15/22* (2006.01)

(52) U.S. Cl.
CPC ............ *G06V 40/166* (2022.01); *G06T 17/20* (2013.01); *G06V 40/171* (2022.01); *G10L 15/22* (2013.01); *G06T 2200/04* (2013.01); *G06T 2200/08* (2013.01)

(58) Field of Classification Search
CPC .... G06V 40/166; G06V 40/171; G06T 17/20; G06T 2200/04; G06T 2200/08; G10L 15/22
See application file for complete search history.

(56) References Cited

U.S. PATENT DOCUMENTS

| 2016/0037137 A1* | 2/2016 | Seiflein ................ G09B 21/006 348/158 |
| 2019/0164055 A1* | 5/2019 | Ljung Larhed .......... G06N 3/08 |
| 2019/0266796 A1* | 8/2019 | Comer .................... G06T 19/20 |
| 2020/0380775 A1* | 12/2020 | Araki ................... H04N 19/597 |

* cited by examiner

*Primary Examiner* — Michelle Chin
(74) *Attorney, Agent, or Firm* — McClure, Qualey & Rodack, LLP (57) ABSTRACT

The invention discloses an imaging device using feature compensation, such a device comprises a vision detecting module, a voice detecting module, a partial-feature database and a three-dimensional (3D) imaging module. The vision detecting module may be configured to 3D mesh information of at least one object based on an imaging signal of the object. The voice detecting module may be configured to detect at least one specific voice of the object and generates a corresponding identification (ID) information. The partial-feature database may be configured to store compensating mesh information of the partial-features of the object. The 3D imaging module may be configured to combine the 3D mesh information of the object with the compensating mesh information, and thereby forms an 3D image. Furthermore, correspondingly, the invention also discloses an imaging method using feature compensation.

20 Claims, 8 Drawing Sheets

applying ↑　　　　　applying ↑

IMAGING DEVICE AND IMAGING METHOD USING FEATURE COMPENSATION

CROSS REFERENCE TO RELATED APPLICATIONS

This Non-provisional application claims priority under 35 U.S.C. § 119(a) on Patent Application No. 109141096 filed in Republic of China on Nov. 24, 2020, the entire contents of which are hereby incorporated by reference.

BACKGROUND

1. Technical Field

The invention relates to a three-dimensional (3D) imaging device and a 3D imaging method, in particular to an imaging device and imaging method for feature compensation using voice detection and selection of the partial-feature.

2. Description of Related Art

With the rapid development of computer graphics technology and artificial intelligence (AI) technology, 3D drawing technology has been commonly used in the film industry or in the online media industry to construct 3D virtual characters or animals, such as virtual characters in science fiction movies or virtual anchor characters on webcast platforms.

In some conventional technologies, a camera is often used to capture a image of a real person, and then a 3D model of the virtual character is generated in real-time through human body recognition or face recognition. However, under the condition of insufficient hardware performance, when operating at a low frame rate, for example, the motion of the 3D model of the virtual character will be inconsistent, which will cause the image to be unsmooth.

In addition, in other conventional technologies, voice and mouth shape databases can also be used to construct a 3D model of the mouth shape feature part of the virtual character, so that the mouth shape movement of the virtual character can be simulated to the mouth shape of areal character action. Moreover, the facial expressions or body movements of the virtual character can be simulated to every expression of real characters.

Most of the above-mentioned conventional technologies use "real-time computing" to generate the 3D model of the virtual character in real time, which requires a lot of computing resources. When computing resources are insufficient, such as low hardware performance, the actions presented by 3D image of the virtual character, for example, the mouth movements, body movements, or other expressions of the virtual character will be incoherent, which will seriously affect the perception.

In addition, the "real-time computing" that generates the virtual character 3D model in real time often involves complex algorithms, which also leads to a substantial increase in the production cost of films or online media programs.

SUMMARY OF THE INVENTION

In order to overcome the above-mentioned technical problems in the prior art, the purpose of the present invention is to provide an improved technical solution, which can output the 3D image of the required frame rate under the condition of insufficient hardware performance, so that the changes of the partial-feature of the virtual character in the 3D image can be kept smooth and reflect the changes of the partial-feature of the real character.

To achieve the above objective, the invention provides an imaging device using feature compensation, which includes a vision detecting module, a voice detecting module, a partial-feature database, and a three-dimensional (3D) imaging module. The vision detecting module receives an imaging signal of at least one object, wherein the object has at least one partial-feature. The vision detecting module generates a 3D mesh information of the object based on the imaging signal. The voice detecting module receives a voice signal of the object and detects at least one specific voice of the object based on the voice signal to generate an identification (ID) information. The partial-feature database stores a plurality of compensating mesh information corresponding to the partial-feature and the ID information. The 3D imaging module is electrically connected to the vision detecting module, the voice detecting module, and the partial-feature database to receive the 3D mesh information, the ID information, and the multiple compensating mesh information, respectively. The 3D imaging module also selects the multiple compensating mesh information corresponding to the ID information from the partial-feature database, and combines the 3D mesh information of the object contained in the imaging signal with at least one of the multiple compensating mesh information to form a 3D image.

In one embodiment, the voice detecting module outputs an ID signal, which contains the ID information corresponding to the at least one specific voice.

In one embodiment, the vision detecting module further outputs the 3D mesh information, which is a 3D mesh, and the 3D imaging module receives the 3D mesh information before combining the 3D mesh information of the object with at least one of the multiple compensating mesh information.

In one embodiment, the 3D imaging module analyzes the ID signal to obtain the ID information corresponding to the specific voice of the object, and selects at least one of the multiple compensating mesh information corresponding to the ID information from the partial-feature database.

In one embodiment, the 3D imaging module includes an image buffering unit, a partial-feature reading unit, and an image compensation unit. The image buffering unit is electrically connected to the vision detecting module to store a 3D model and a time stamp corresponding to a frame sequence in the imaging signal. The partial-feature reading unit is electrically connected to the voice detecting module to receive the ID signal, and the ID information is obtained from analysis of the ID signal, and thereby reading the multiple compensating mesh information corresponding to the ID information. The image compensation unit is electrically connected to the image buffering unit and the partial-feature reading unit, and the compensating mesh information closest to the frame sequence in the imaging signal is selected from the multiple compensating mesh information.

In one embodiment, the 3D image is formed by inserting the 3D mesh information combined with the at least one of the multiple compensating mesh information into the frame sequence of the imaging signal after combining the 3D mesh information of the object with at least one of the multiple compensating mesh information.

In one embodiment, the 3D image is with a frame rate required by a user.

In one embodiment, the partial-feature may include at least one mouth shape feature of the object, and the mouth shape feature corresponds to the specific voice of the object, and the multiple compensating mesh information corresponding to the mouth shape feature is stored in the partial-feature database.

In one embodiment, the 3D imaging module directly forms the 3D image based on the 3D mesh information of the object if a first rate of the imaging signal is greater than or equal to a frame rate required by the user.

In one embodiment, the imaging device further includes an image capturing module, a voice capturing module, and an image outputting module. The image capturing module is electrically connected to the vision detecting module and captures the image of the object to generate the imaging signal. The voice capturing module is electrically connected to the voice detecting module and captures the voice of the object to generate the voice signal. The image outputting module is electrically connected to the 3D imaging module and outputs the 3D image or performs subsequent image processing to the 3D image.

In addition, to achieve the above objective, the invention also provides an imaging method using feature compensation, which includes the following steps. Step 1 is to generate a 3D mesh information of at least one object based on an imaging signal of the object having at least one partial-feature. Step 2 is to detect at least one specific voice of the object based on a voice signal of the object, and thereby generate an ID information corresponding to the specific voice. Step 3 is to select a plurality of compensating mesh information corresponding to the ID information from a partial-feature database, wherein the multiple compensating mesh information corresponds to the partial-feature, and to combine the 3D mesh information of the object with at least one of the multiple compensating mesh information to form a 3D image.

In one embodiment, the imaging method further includes the step of outputting an ID signal, which contains the ID information corresponding to the at least one specific voice.

In one embodiment, the 3D mesh information is a 3D mesh outputted after generating a 3D mesh information of at least one object based on an imaging signal of the object; and the 3D mesh information is received before the 3D imaging module combines the 3D mesh information of the object with at least one of the multiple compensating mesh information to form the 3D image.

In one embodiment, the ID information corresponding to the specific voice is obtained by analyzing the ID signal before selecting the multiple compensating mesh information corresponding to the ID information from a partial-feature database.

In one embodiment, the step of selecting the compensating mesh information of the partial-feature from the partial-feature database includes the following sub-steps. Sub-step 1 is to store a 3D mesh information and a time stamp corresponding to a frame sequence in the imaging signal. Sub-step 2 is to obtain the ID information corresponding to the specific voice by analyzing the ID signal. Sub-step 3 is to select the compensating mesh information corresponding to the ID information from the partial-feature database. Sub-step 4 is to select at least one of the compensating mesh information, which is closest to the frame sequences in the imaging signal from the multiple compensating mesh information.

In one embodiment, after combining the 3D mesh information of the object with at least one of the multiple compensating mesh information, the imaging method further includes the step of inserting the 3D mesh information combined with the at least one of the multiple compensating mesh information into the frame sequence of the imaging signal to form the 3D image.

In one embodiment, the partial-feature is at least one mouth shape feature of the object that corresponds to the specific voice of the object, and a plurality of compensating mesh information of the mouth shape feature is stored in the partial-feature database.

In one embodiment, the specific voice corresponds to the voice of a single word.

In one embodiment, the imaging method further includes the steps of determining the relationship between a first rate of the imaging signal and a frame rate required by a user, and if the result of the determination is that the first rate is greater than or equal to the frame rate required by the user, then the 3D mesh information of the object is directly formed into the 3D image.

Based on the above-mentioned embodiments of the technical solution, the present invention can achieve the following technical effects. When the poor performance of the hardware causes the frame rate of the original imaging signal or the imaging signal (i.e., the first rate) to be lower than the frame rate required by the user (i.e., the second rate), a compensation mechanism can be used by selecting the 3D mesh for partial-feature closest to the imaging signal frame from the partial-feature database for compensation, so that the frame rate of the 3D image signal after compensation can reach the second rate required by the user.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

Reference will now be made to the drawings to describe various inventive embodiments of the present disclosure in detail, wherein like numerals refer to like elements throughout.

Figure 1:
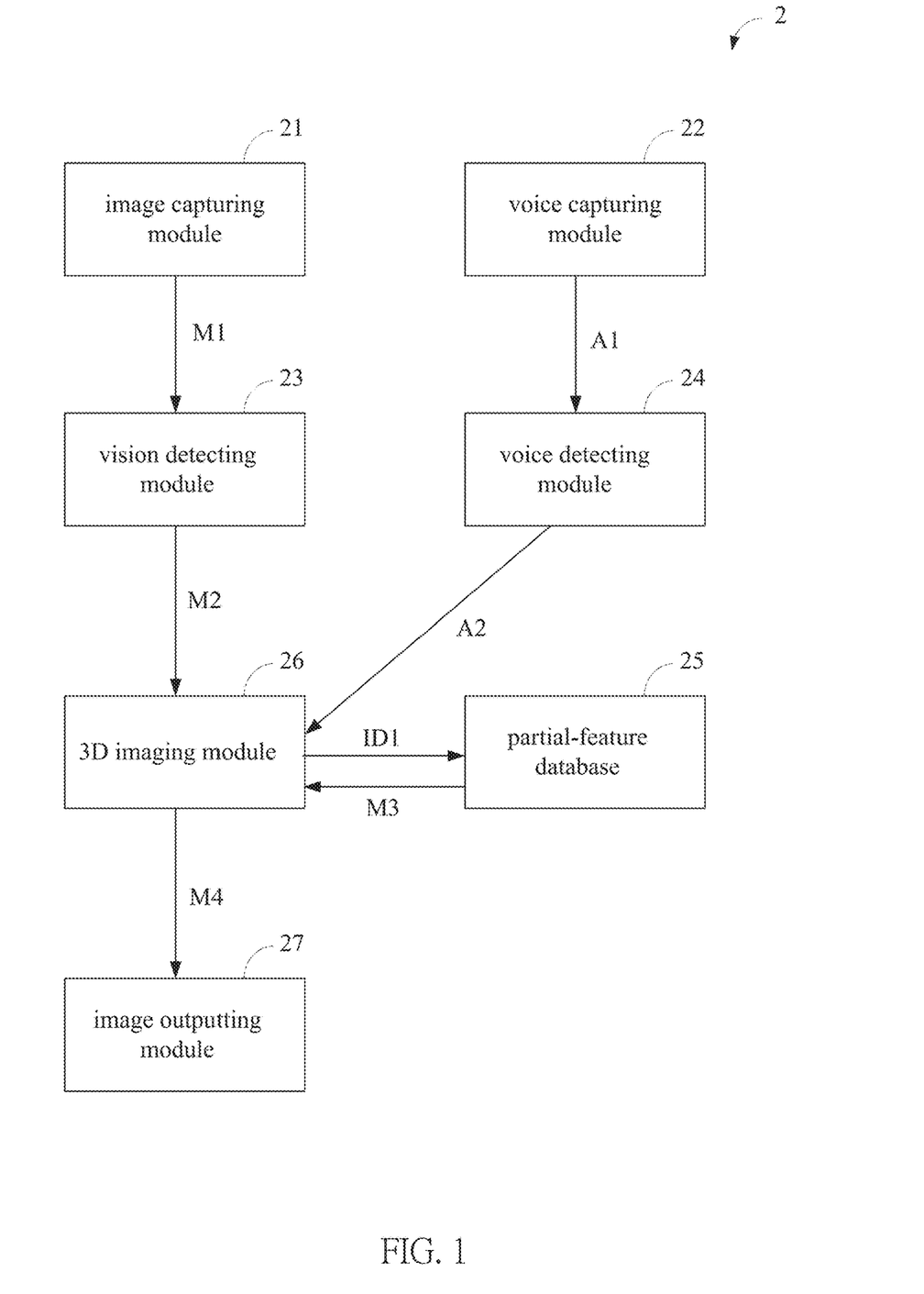
FIG. 1 is a block diagram showing the imaging device using feature compensation according to the first embodiment of the invention.

FIG. 1 is a block diagram of an imaging device 2 using feature compensation according to the first embodiment of the invention. As shown in FIG. 1, the imaging device 2 includes at least an image capturing module 21, a voice capturing module 22, a vision detecting module 23, a voice detecting module 24, a three-dimensional (3D) imaging module 26, a partial-feature database 25, and an image outputting module 27.

The image capturing module 21 can be, for example, a Webcam, an image capture card, or any other photographic device. The image capturing module 21 can capture images of at least one object and output an imaging signal. In the embodiment, the imaging signal may be an original imaging signal M1 generated by the image capturing module 21, and the original imaging signal M1 contains the image information of the object. In the embodiment, the object is, for example, a real person, and the original imaging signal M1 may contain information related to a full body image, upper body image, or face image of the real person. It is to be noted that in other embodiments, the imaging signal may be the imaging signal from other audio and video sources, such as an audio and video streaming signal from the internet, in addition to the original imaging signal described above.

The vision detecting module 23 is electrically connected to the image capturing module 21, and receives the imaging signal (i.e., the original imaging signal M1) of the object from the image capturing module 21, and thereby detects or computes the position of the object and the partial-feature of object based on the imaging signal. Among them, the partial-feature is, for example, facial features of a real person (for example, eyebrow features, eye features, nose features, mouth shape features, etc.). The vision detects module 23 further generates a 3D mesh of the object, and outputs an imaging signal M2. Among them, the imaging signal M2 contains the relevant information of the 3D mesh of the object, which is used for subsequent imaging of a 3D model. It should be noted that the 3D mesh information of the object contained in the imaging signal M2 is the 3D mesh of the whole of the object (i.e., real person), such as the 3D mesh of the whole face of the real person, the 3D mesh of the upper body of the real person, or the 3D mesh of the entire body of the real person. In other embodiments, the imaging signal M2 also can be the 3D mesh of the object only.

The voice capturing module 22 can be, for example, a microphone or any other device capable of receiving sound. The voice capturing module 22 detects, captures and records the sound or voice of the object (i.e., the real person), and outputs a voice signal. In the embodiment, the voice signal is the original voice signal A1 generated by the voice capturing module 22. Among them, the original voice signal A1 contains the sound or voice information of the object. In other embodiments, the voice signal may also be a voice signal from other audio and video sources, such as an audio and video streaming signal from the internet.

The voice detecting module 24 is electrically connected to the voice capturing module 22, and receives the voice signal (i.e., the original voice signal A1) of the object (i.e., the real person) from the voice capturing module 22, and detects or computes one of the specific voice of the real person based on the voice signal. In addition, the voice recognition process can be further performed to identify that the specific voice corresponds to certain sentences or certain words (for example, corresponds to a single sord "you", "me", or "he", etc.). The voice detecting module 24 also generates and outputs an ID signal A2. Among them, the ID signal A2 contains the ID information (for example the ID code) ID1 corresponding to the specific voices. The ID information ID1 is used to select the compensating mesh information corresponding to the partial-feature (i.e., the mouth shape feature) from the database (for example, the partial-feature database 25 described in the next paragraph).

The partial-feature database 25 stores the various possible partial-features of real characters (such as the mouth shape features), that is, various mouth shape features that may occur when real characters make various pronunciations or enunciates, and also stores the compensating mesh information M3 corresponding to the mouth shape feature. Furthermore, the compensating mesh information M3 corresponding to various mouth shape features is used to perform a feature compensation mechanism when the first rate of the imaging signal M2 is lower than the frame rate required by the user. It should be noted that the so-called real person here can refer to the aforementioned object, or other real or virtual person, creatures, or characters, etc., that is not limited.

For further example, the compensating mesh information M3 recorded in the partial-feature database 25 may include a plurality of compensation mesh frames (such as M3(a)-M3(n)). The compensation mesh frames may correspond to the complete mouth shape features of a real person for a specific single word voice such as "you". In other embodiments, the compensation mesh frames can also correspond to the continuous mouth shape features of certain specific sentences.

The 3D imaging module 26 is electrically connected to the vision detecting module 23, the voice detecting module 24, and the partial-feature database 25, respectively. The 3D imaging module 26 receives the imaging signal M2 output by the vision detecting module 23, and generates a 3D image model based on the 3D mesh information contained in the imaging signal M2. The 3D image model can be presented as a 3D image M4 of a virtual character, such as the 3D image M4 of a virtual anchor on a network video platform or a cartoon character. In other words, generates a 3D image corresponding to the 3D mesh information contained in the imaging signal M2. In other embodiments, the 3D image M4 can also be the whole body of 3D image, the half body of 3D image, or the head of 3D image of the virtual character, that is not limited.

In a normal mode mod-0, the hardware performance of a personal computer or mobile device is sufficient for the image capturing module 21 and the vision detecting module 23 to operate smoothly. In other words, in the normal mode mod-0, the image capturing module 21 and the vision detecting module 23 output the image frame or the 3D mesh information fast enough to meet the frame rate required by the user. For example, the frame rate required by the user is 60 FPS (frame per second), and in the normal mode mod-0, the image capturing module 21 and the vision detecting module 23 are sufficient to output the image frame or the 3D mesh information by the frame rate of 60 FPS. At this time, as long as the image capturing module 21, the vision detecting module 23, and the 3D imaging module 26 can be used to smoothly produce the 3D image M4 with 60 FPS, without resorting to the voice capturing module 22 and the voice detecting module 24. In other words, in the 3D image M4 with 60 FPS generated (generating the 3D image M4 is fast enough to meet the frame rate required by the user) in the normal mode mod-0, the changes in the feature part of the virtual character (such as changes in the mouth shape) are smooth and continuous, the changes of the mouth shape feature of the 3D image M4 can smoothly reflect every pronunciation or enunciate of a real person.

However, if the hardware performance of the personal computer or mobile device is insufficient, for example, the user adopts hardware with poor specifications or the current software and hardware have a large load, it is slow to the output efficiency of the image capturing module 21 and the vision detecting module 23 for the image frames or the 3D mesh information, or generating the 3D image M4, such as 40 FPS, which is lower than the frame rate required by the user, such as 60 FPS, then the imaging device 2 is switched to the compensation mode mod-1. In the compensation mode mod-1, the image capturing module 21, the vision detecting module 23, and the 3D imaging module 26 must also be assisted by the voice capturing module 22 and the voice detecting module 24 to smoothly generate the 3D image M4 with 60 FPS.

In the compensation mode mod-1, the 3D imaging module 26 obtains the ID information ID1 corresponding to each specific voice and specific mouth shape feature from the ID signal A2 received from the voice detecting module 24. In addition, the 3D imaging module 26 selects the compensating mesh information M3 for mouth shape feature corresponding to the ID information ID1 from the partial-feature database 25. In this case, the partial-feature database 25 can be set separately with the 3D imaging module 26, or can be part of the 3D imaging module. Then, the 3D image M4, for example virtual character, virtual anchor, cartoon character, with 60 FPS is obtained by the 3D imaging module 26 to combine the compensating mesh information M3 for mouth shape feature, which is selected from the partial-feature database 25, with the 3D mesh of the human face contained in the imaging signal M2, which is received from the vision detecting module 23.

The image outputting module 27 is electrically connected to the 3D imaging module 26 to receive the 3D image M4 from the 3D imaging module 26, and output the 3D image M4 or perform subsequent images processing or post-production to the 3D image M4. In the embodiment, the image outputting module 27 can be, for example, a screen, a display, or other subsequent image processing or image post-production modules.

Figure 2A:
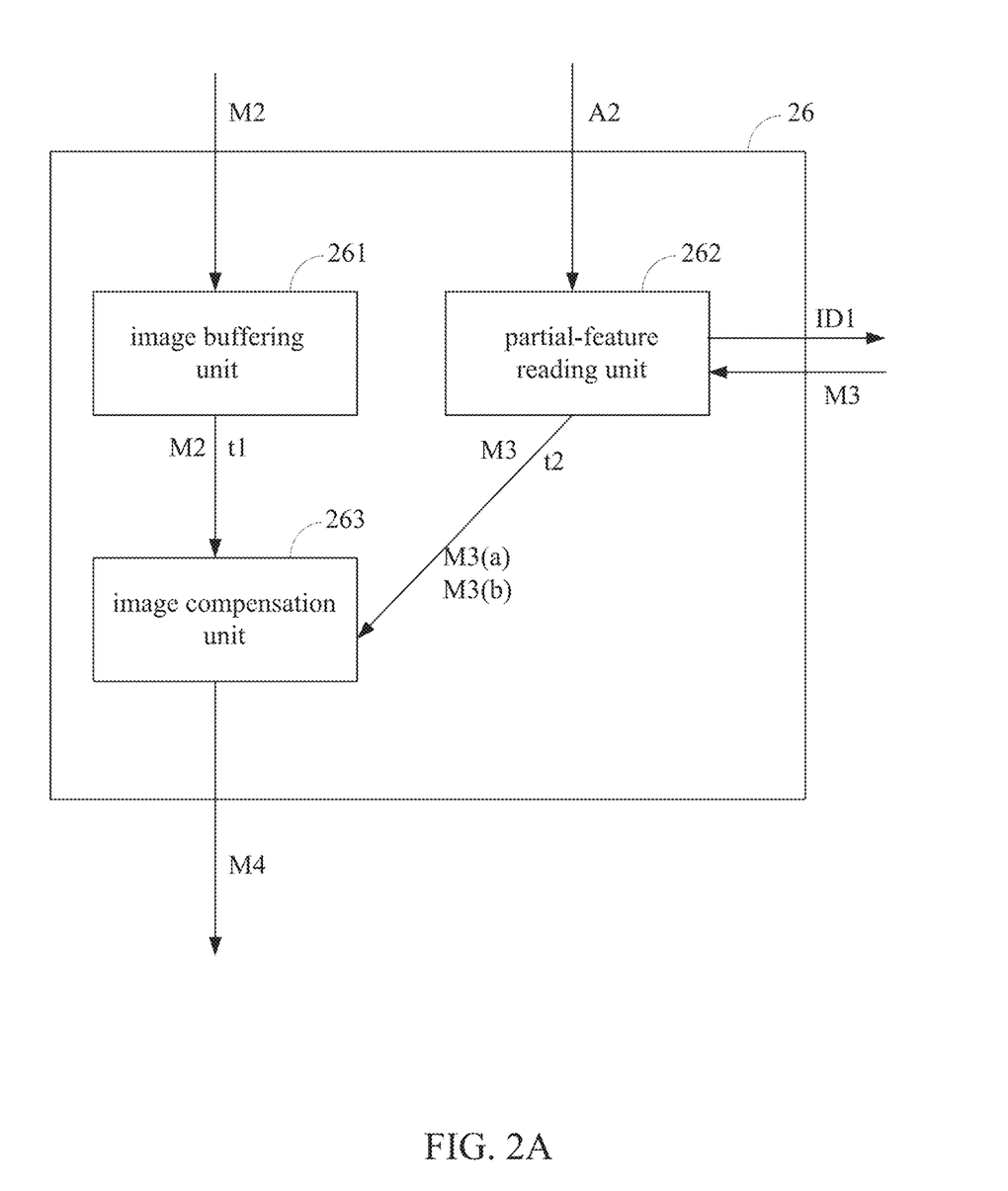
FIG. 2A is a block diagram showing the internal composition of the 3D imaging module according to the first embodiment of the invention.

FIG. 2A is a block diagram of the internal components of the 3D imaging module 26 based on the first embodiment of the invention. As shown in FIG. 2A, the 3D imaging module 26 includes an image buffering unit 261, a partial-feature reading unit 262, and an image compensation unit 263.

The image buffering unit 261 receives the imaging signal M2 from the vision detecting module 23 (not shown in FIG. 2A), and stores a 3D model (actually also can stores the imaging signal M2 or the 3D mesh information, for example, the 3D mesh of the object only) and a time stamp t1 corresponding to each frame image in the imaging signal M2 in a memory of the image buffering unit 261.

The partial-feature reading unit 262 receives the ID signal A2 from the voice detecting module 24 (not shown in FIG. 2A), and reads the compensating mesh information M3 for mouth shape feature in the partial-feature database 25 (not shown in the figure) based on the ID information of the mouth shape feature contained in the ID signal A2. The compensating mesh information M3 for mouth shape feature also has a corresponding time stamp t2.

The image compensation unit 263 determines whether compensation should be performed based on the imaging signal M2 and the time stamp t1 output by the image buffering unit 261, and the compensating mesh information M3 for mouth shape feature and the time stamp t2 output by the partial-feature reading unit 262. It should be noted that the so-called "compensation" refers to selecting the compensating mesh information M3 for mouth shape feature in the partial-feature database 25, and compensating the compensating mesh information M3 for mouth shape feature to the imaging signal M2. In one aspect, the mechanism for determining whether compensation should be performed is to determine whether the rate of the imaging signal M2 (i.e., the first rate) meets the frame rate required by the user (i.e., the second rate). In detail, if the first rate (for example, 60 FPS) is greater than or equal to the second rate (for example, 60 FPS), no compensation is required; if the first rate (for example, 40 FPS) is less than the second rate (for example, 60 FPS), compensation is required.

If it is determined that compensation should be performed, the compensation mode mod-1 is performed, that is to compare and search the mouth shape feature of the 3D mesh corresponding to the previous frame of the imaging signal M2 with the compensating mesh information M3 for mouth shape feature read by the partial-feature reading unit 262, and thereby select a compensation mesh frame for mouth shape features M3(*a*), which is closest to the compensating mesh information M3 for mouth shape feature read by the partial-feature reading unit 262. It should be noted that the selected compensation mesh frame for mouth shape features M3(*a*) is the mouth shape feature corresponding to the previous frame closest to the imaging signal M2. Similarly, the compensation mesh frame for mouth shape features M3(*b*) that is closest to the imaging signal M2 in the next frame is also selected. Then, the compensation is performed by the interpolation method based on the actual frame rate. The compensating mesh information M3 for mouth shape feature, which is in the partial-feature database 25 selected from the partial-feature reading unit 262, and the closest compensation mesh frame for mouth shape features M3(*a*) and M3(*b*) are applied into the frames of the imaging signal M2 and inserted into the frame sequence of the imaging signal M2 to form the 3D image M4 that to be output. In other words, using the compensating mesh information M3 for mouth shape feature to compensate the imaging signal M2 with a slower frame rate (for example, 40 FPS), it can become the 3D image M4 with the frame rate required by the user (for example, 60 FPS).

In addition, if it is determined that no compensation is required, the operation is restored to the normal mode mod-0. At this time, there is no need to use the compensating mesh information M3 for mouth shape feature for compensation, and the imaging signal M2 output by the image buffering unit 261 can be directly output as the 3D image M4.

Figure 2B:
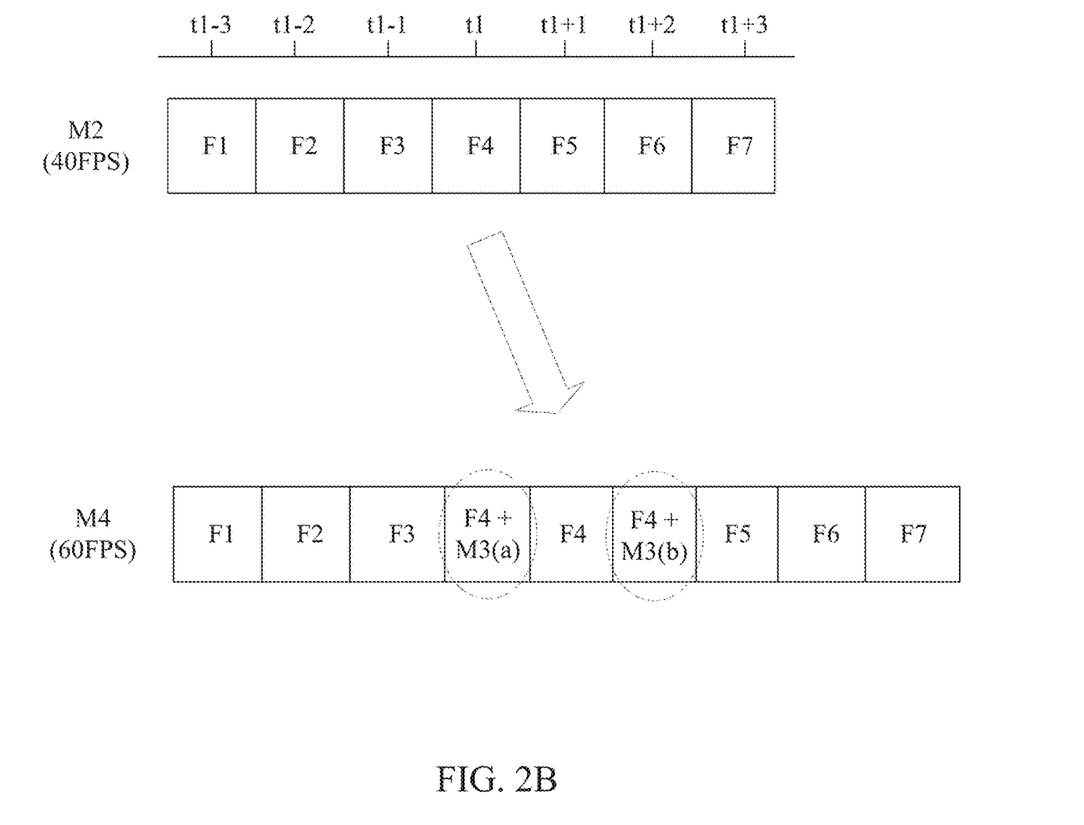
FIGS. 2B and 2C are schematic diagrams showing the compensation mechanism of the mouth shape feature according to the first embodiment of the invention.
Figure 2C:
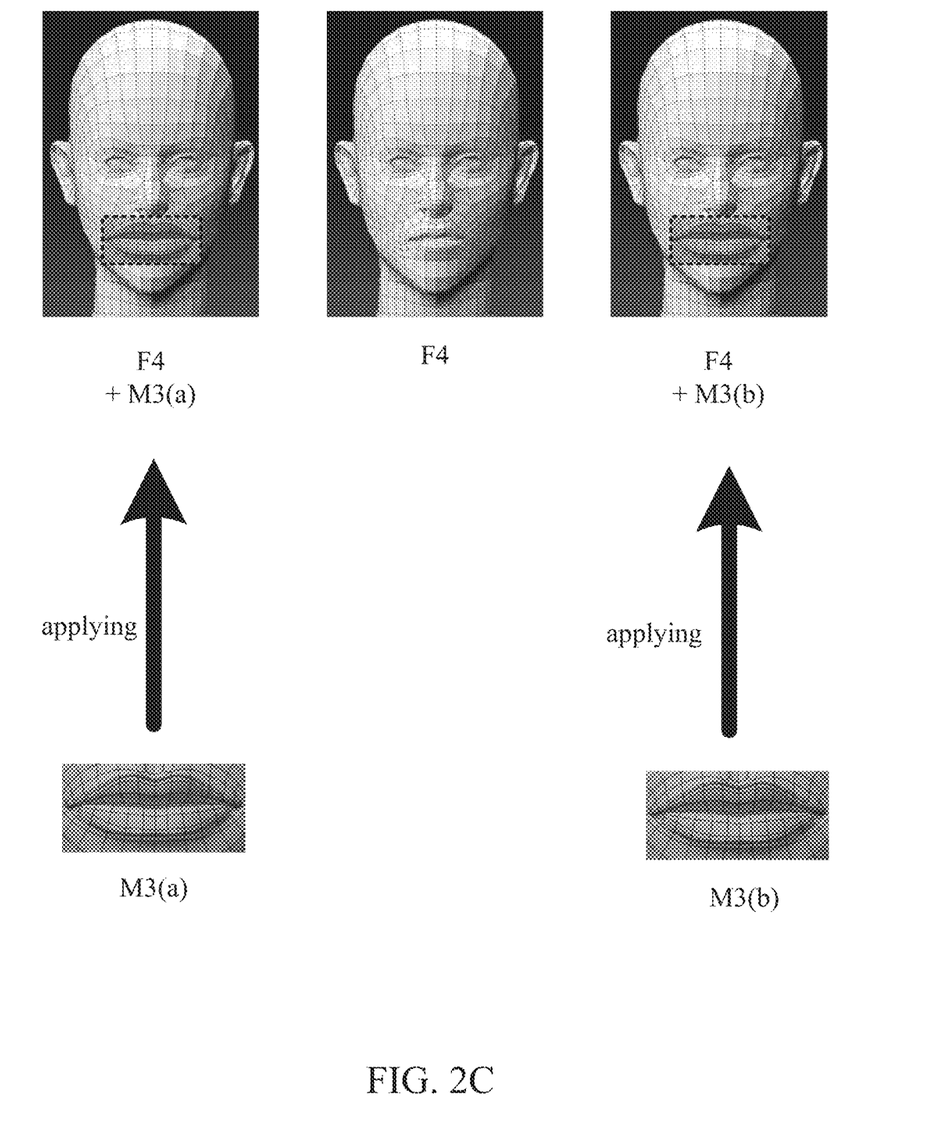

FIG. 2B and FIG. 2C are schematic diagrams of the compensation mechanism of the mouth shape feature based on the first embodiment of the invention. Referring to FIGS. 2A to 2C at the same time, the frame rate of the frame sequence F1 . . . F3, F4, F5, F6 . . . of the imaging signal M2 from the image buffering unit 261 is 40 FPS. The time stamp of a current frame F4 of the imaging signal M2 is t1, the time stamp of a previous frame F3 is t1−1, and the time stamp of a next frame F5 is t1+1.

The partial-feature reading unit 262 finds the compensation mesh frame for mouth shape features M3(*a*) that is closest to the previous frame F3 in the imaging signal M2 from the partial-feature database 25, and finds the compensation mesh frame for mouth shape features M3(*b*) that is closest to the next frame F5 in the imaging signal M2. In the embodiment, the compensation mesh frame for mouth shape features M3(*a*) and M3(*b*) are all from the partial-feature database 25.

Then, according to the actual frame rate, the compensation mesh frame for mouth shape features M3(*a*) is applied to the current frame F4 by the interpolation method to form a frame (F4+M3(*a*)), and the frame (F4+M3(*a*)) is inserted between the current frame F4 and the previous frame F3. Similarly, the compensation mesh frame for mouth shape features M3(*b*) is applied to the current frame F4 by the interpolation method to form a frame (F4+M3(*b*)), and the frame (F4+M3(*b*)) is insert between the current frame F4 and the next frame F5. The compensated frame sequence F1 . . . F3, (F4+M3(*a*)), F4, (F4+M3(*b*)), F5, F6 . . . becomes the 3D image M4 to be output, and the frame rate is 60 FPS.

In other embodiments, the partial-feature database 25 may pre-store the 3D mesh corresponding to other features of the real person, such as the 3D mesh corresponding to the eyes or arms. When a real person performs facial expression changes or body movements, the eye part or arm part in the 3D image model can be compensated with the 3D mesh of the eye part or the 3D mesh of the arm part pre-stored in the partial-feature database 25. In other words, if it is determined that compensation should be performed, the 3D imaging module may use the 3D mesh of compensating mesh information from the partial-feature database to combines the 3D mesh information of the object, and than form the 3D image. The compensation mechanism can refer the imaging method described in the invention.

Figure 3A:
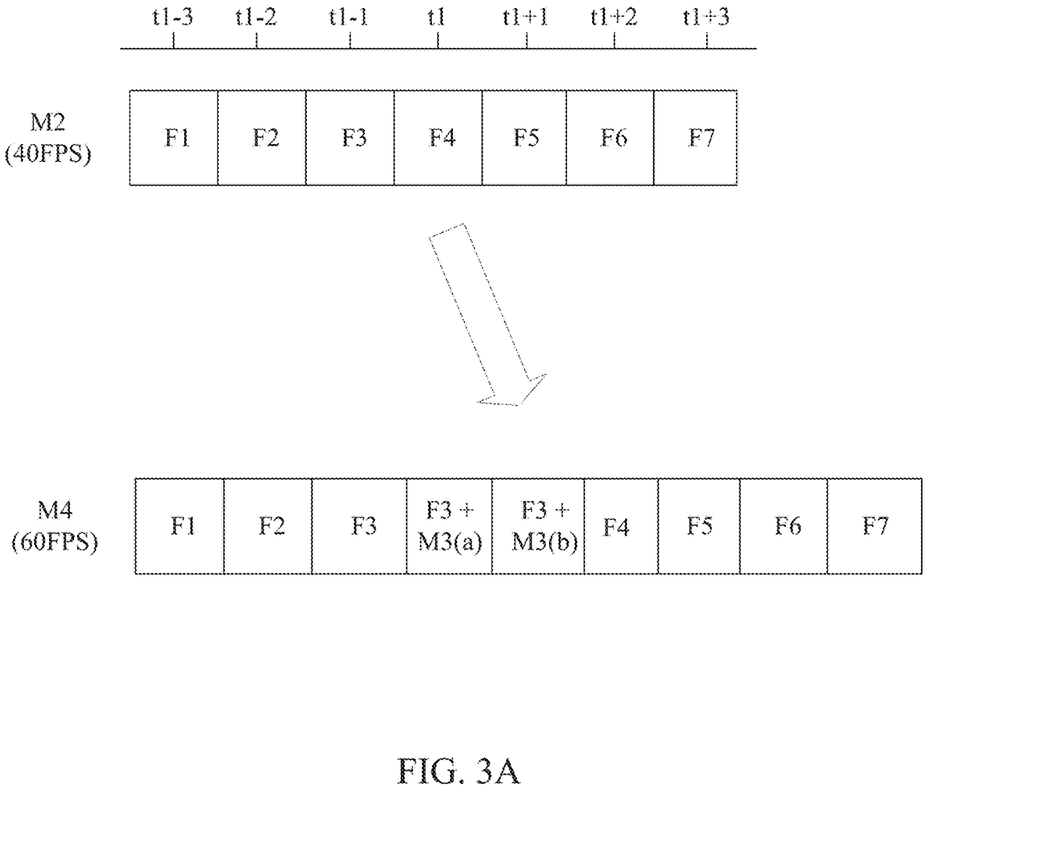
FIGS. 3A and 3B are schematic diagrams showing the aspects of other mouth shape feature compensation mechanisms.

Please refer to FIG. 3A, in other implementations, as described above, the frame rate of the frame sequence F1 . . . F3, F4, F5 . . . F7 . . . of the imaging signal M2 from the image buffering unit 261 is 40 FPS. The time stamp of the frame F4 of the imaging signal M2 is t1, the time stamp of the frame F3 is t1−1, and the time stamp of the frame F5 is t1+1. The partial-feature reading unit 262 finds the compensation mesh frame for mouth shape features M3(*a*) that is closest to frame F3 in the imaging signal M2 from the partial-feature database 25, and finds the compensation mesh frame for mouth shape features M3(*b*) that is closest to the frame F4 in the imaging signal M2. Then, according to the actual the frame rate, the compensation mesh frame for mouth shape features M3(*a*) and M3(*b*) are applied to the frame F3 to form a frame (F3+M3(*a*)) and a frame (F3+M3(*b*)), and insert the frames (F3+M3(*a*)) and (F3+M3(*b*)) between the frame F4 and the frame F3. In other embodiments, the time stamp of the frame F4 of the imaging signal M2 is t1, the time stamp of the frame F3 is t1−3 (just for an example, and does not correspond to FIG. 3A), and insert the frames (F3+M3(*a*)) and (F3+M3(*b*)) between the frame F4 and the frame F3 based on the frame rate required by the user. The compensated frame sequence μl . . . F3, (F3+M3 (*a*)), (F3+M3(*b*)), F4, F5 . . . F7 . . . becomes the 3D image M4 to be output.

Figure 3B:
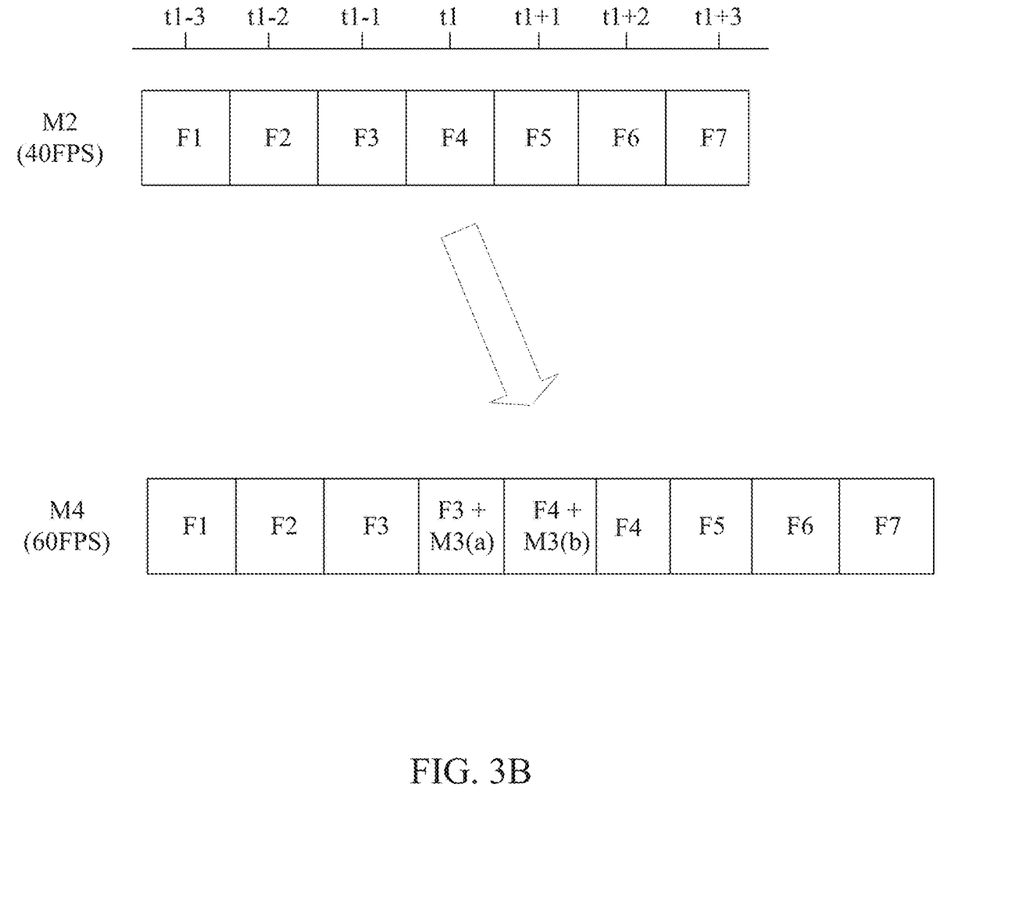

In addition, the combination of the feature of compensation mesh frame and the frame of imaging signal M2 may be different depending on the actual image, the imaging signal, or the detection result, for example, as shown in FIG. 3B, the compensation mesh frame for mouth shape features M3(*a*) can be applied to the frame F3 to form the frame (F3+M3 (*a*)), and then, the compensation mesh frame for mouth shape features M3(*b*) is applied to the frame F4 to form the frame (F4+M3(*b*)), and finally, insert the frames (F3+M3(*a*)) and (F4+M3(*b*)) are inserted between the frame F4 and the frame F3. In other embodiments, the time stamp of the frame F4 of the imaging signal M2 is t1, the time stamp of the frame F3 is t1−3 (just for an example, and does not correspond to FIG. 3A), and insert the frames (F3+M3(*a*)) and (F4+M3(*b*)) between the frame F4 and the frame F3 based on the frame rate required by the user. The compensated frame sequence F1 . . . F3, (F3+M3(*a*)), (F4+M3(*b*)), F4, F5 . . . F7 . . . becomes the 3D image M4 to be output.

To further explain, the compensation mesh frame for mouth shape features M3(*a*) and M3(*b*) mentioned above can also add more compensation mesh frame stored in the partial-feature database based on the actual computing results. Even the compensation mesh frame can be computed by artificial intelligence (AI) in real time.

Figure 4A:
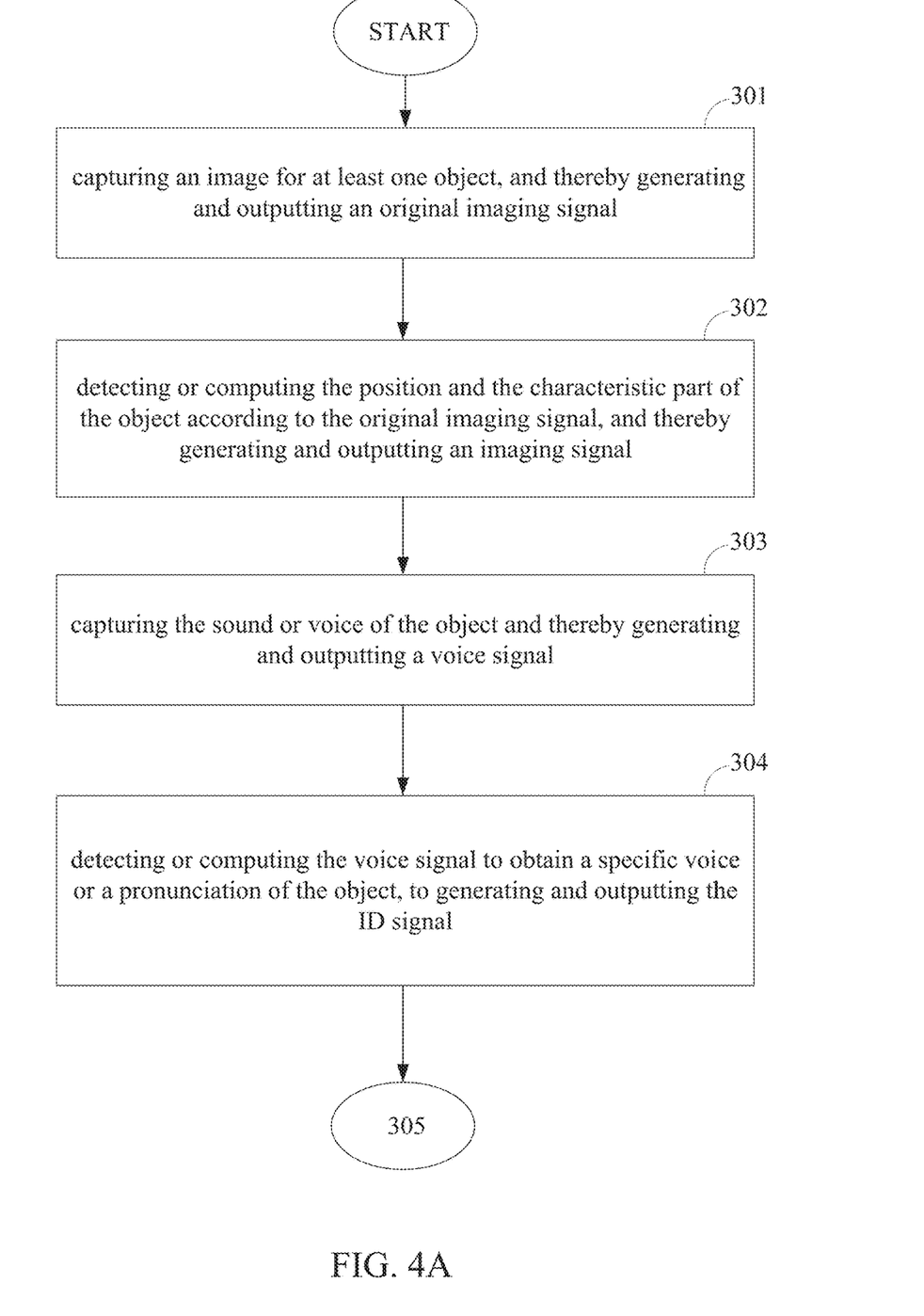
FIGS. 4A and 4B are schematic diagrams showing the flow chart of the imaging method using feature compensation according to the second implementation of the invention.
Figure 4B:
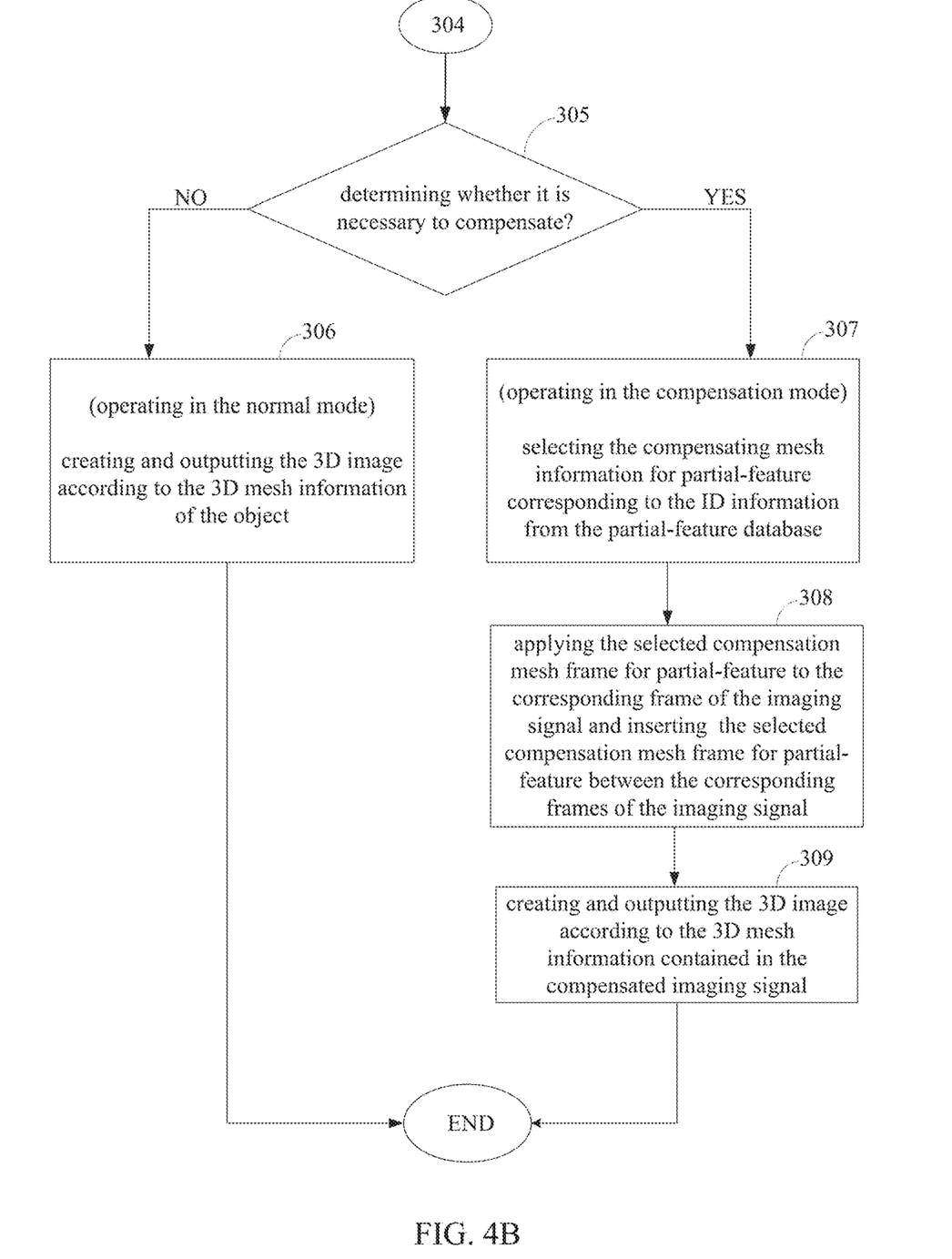

FIGS. 4A and 4B are flowcharts of the imaging method using feature compensation according to the second embodiment of the invention. The imaging method of the second embodiment roughly corresponds to the imaging device 2 of the first embodiment, but the imaging method of the second embodiment can also be executed by hardware devices other than the imaging device 2. The imaging method using feature compensation includes steps 301 to 310.

Referring to FIGS. 4A and 4B at the same time, first, step 301 is to capture an image for at least one object, and thereby generating and outputting an imaging signal (i.e., an original imaging signal M1), which contains the image information of the object. The object is, for example, a real person, and the captured image can be a full body image, upper body image, or face image of the real person.

Next, in step 302, the position of the object and the characteristic part of the object (the real person) are detected or computed based on the imaging signal (i.e., the original imaging signal M1). The characteristic part is, for example, the facial features of the real person. Then, an imaging signal M2 is output, wherein the imaging signal M2 contains the relevant information of the 3D mesh of the object, and the frame rate of the imaging signal M2 is a first rate.

Then, in step 303, the sound or voice of the object (the real person) is detected, captured, and recorded, and a voice signal (i.e., an original voice signal A1) is output. Among them, the voice signal contains the sound or voice information of the object.

Then, in step 304, the specific voice or the pronunciation of a specific character of the real person is detected or computed based on the voice signal (i.e., the original voice signal A1), and then an ID signal A2 is output. Among them, the ID signal A2 contains the ID information ID1 of the partial-feature corresponding to the specific voice or the specific pronunciation (such as specific mouth shape features).

It is should be noted that step 303 and step 304 do not need to be subsequent to step 301 and step 302, but can be performed at the same time. In other words, the image and voice of the object occur at the same time, and the original imaging signal M1 and the original voice signal A1 are also captured at the same time.

Next, step 305 is to determine whether it is necessary to operate in a compensation mode mod-1. In the embodiment, a first rate of the imaging signal M2 is compared with a second rate required by the user. The compensation is unnecessary if the first rate (for example, 60 FPS) is greater than or equal to the second rate (for example, 60 FPS), and at this time, step 306 will be executed to operate in a normal mode mod-0. On the other hand, the compensation is necessary if the first rate (for example, 40 FPS) is less than the second rate (for example, 60 FPS), and at this time, step 307 will be executed to operate in the compensation mode mod-1.

Step 306 is operating in the normal mode mod-0. In this mode, the 3D mesh information of the object contained in the imaging signal M2 generated in step 302 is used to directly create a 3D image M4, and output the 3D image M4 to a screen or various display devices. The frame rate of the 3D image M4 can reach the second rate required by the user.

In addition, step 307 is operated in the compensation mode mod-1, which is to select the compensating mesh information for example the compensating mesh information M3 for partial-feature corresponding to the ID information ID1 from the compensating mesh information M3 for all partial-feature stored in the partial-feature database based on the ID information ID1 recorded in step 304. It is to be noted that in the embodiment, the compensating mesh information M3 for partial-feature stored in the partial-feature database 25 includes various mouth features of the object corresponding to different voices. In other embodiments, the 3D mesh of the compensating mesh information for partial-feature may also include the partial-feature of other parts of the real person, such as hand features, eye features, or cheek muscle features. For example, step 307 is to select the compensation mesh frame M3(a) (or the 3D mesh of compensating mesh information) for partial-feature (mouth shape feature) that is corresponding to the ID information ID1 and closest to the previous frame of the imaging signal M2 based on the ID information ID1, and select the compensation mesh frame M3(b) (or the 3D mesh of compensating mesh information) for partial-feature (mouth shape feature) that is closest to the next frame of the imaging signal M2.

Next, in step 308, the selected compensation mesh frame M3(a) (or the 3D mesh of compensating mesh information) for partial-feature (mouth shape feature) is applied to the current frame of the imaging signal M2 and inserted between the corresponding frames (i.e., the current frame and the previous frame) of the imaging signal M2. Similarly, the selected compensation mesh frame M3(b) (or the 3D mesh of compensating mesh information) for partial-feature (mouth shape feature) is applied to the current frame of the imaging signal M2 and inserted between the corresponding frames (i.e., the current frame and the next frame) of the imaging signal M2. The frame rate of the imaging signal M2 before compensation is the first rate (for example, 40 FPS), which cannot meet the frame rate required by the user. However, with the compensation and insertion of the compensation mesh frame for mouth shape features M3(a) and M3(b) (or the 3D mesh of compensating mesh information), the frame rate of the imaging signal M2 can be increased to the second rate (for example, 60 FPS), which can meet the frame rate required by the user.

Next, in step 309, the 3D mesh information contained in the imaging signal M2 with the second rate (for example, 60 FPS) after being compensated is converted into a 3D model be presented as a 3D image M4 with the second rate. Finally, the 3D image M4 is output to the screen or various display devices, and the method of the second embodiment of the invention is completed at this time.

With the imaging device using feature compensation of the first embodiment and the imaging method using feature compensation of the second embodiment, when the poor performance of the hardware causes the frame rate of the original imaging signal or the imaging signal (i.e., the first rate) to be lower than the frame rate required by the user (i.e., the second rate), a compensation mechanism can be used by selecting the 3D mesh for partial-feature (for example, the 3D mesh for mouth shape feature) closest to the imaging signal frame from the partial-feature database, applying the 3D mesh for partial-feature to the corresponding frame of the image signal, and inserting the 3D mesh for partial-feature between the corresponding frame of the image signal, so that the frame rate of the compensated 3D image signal can reach the second rate required by the user. The mouth shape features of the virtual character in the compensated 3D image can display smoothly and reflect the actual mouth movement of the real character smoothly, and smoothly reflect each pronunciations or enunciates of the real character, so that the image will not be inconsistent.

In addition, by using the 3D mesh for partial-feature pre-stored in the partial-feature database, the imaging device and imaging method of the invention do not need to perform real-time computing on the 3D mesh for partial-feature so as to save the computing resources.

In summary, the imaging device and imaging method using feature compensation of the invention can obtain the compensation mesh for partial-feature corresponding to the 3D image from the partial-feature database under the condition of insufficient hardware performance to compensate for the missing frame, so that the 3D image and voice can be completely corresponded to each other. In this way, when the viewer is watching the video of the virtual image, the partial-feature (such as the mouth shape, cheek muscles, or eye shape) does not match the voice will not happen.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. An imaging device using feature compensation, comprising:
a vision detecting module, which receives an imaging signal of at least one object, wherein the object has at least one partial-feature, and generates a three-dimensional (3D) mesh information of the object based on the imaging signal;
a voice detecting module, which receives a voice signal of the object and detects at least one specific voice of the object based on the voice signal to generate an identification (ID) information;
a partial-feature database, which stores a plurality of compensating mesh information corresponding to the partial-feature and the ID information; and
a 3D imaging module, which is electrically connected to the vision detecting module, the voice detecting module, and the partial-feature database to receive the 3D mesh information, the ID information, and the multiple compensating mesh information, selects the multiple compensating mesh information corresponding to the ID information from the partial-feature database, and combines the 3D mesh information of the object with at least one of the multiple compensating mesh information to form a 3D image, wherein the compensating mesh information closest to a frame sequence in the imaging signal is selected from the multiple compensating mesh information.

2. The imaging device of claim 1, wherein the voice detecting module outputs an ID signal, where the ID signal contains the ID information corresponding to the at least one specific voice.

3. The imaging device of claim 1, wherein the vision detecting module further outputs the 3D mesh information, which is a 3D mesh, and the 3D imaging module receives the 3D mesh information before combining the 3D mesh information of the object with at least one of the multiple compensating mesh information.

4. The imaging device of claim 1, wherein the 3D imaging module analyzes the ID signal to obtain the ID information corresponding to the specific voice of the object, and selects at least one of the multiple compensating mesh information corresponding to the ID information from the partial-feature database.

5. The imaging device of claim 4, wherein the 3D imaging module comprising:
an image buffering unit, which is electrically connected to the vision detecting module to store the 3D mesh information and a time stamp corresponding to Hall the frame sequence in the imaging signal;
a partial-feature reading unit, which is electrically connected to the voice detecting module to receive the ID signal, and the ID information is obtained from analysis of the ID signal, and thereby reading the multiple compensating mesh information corresponding to the ID information; and
an image compensation unit, which is electrically connected to the image buffering unit and the partial-feature reading unit, and the compensating mesh information closest to the frame sequence in the imaging signal is selected from the multiple compensating mesh information.

6. The imaging device of claim 5, wherein the 3D image is formed by inserting the 3D mesh information combined with the at least one of the multiple compensating mesh information into the frame sequence of the imaging signal after combining the 3D mesh information of the object with at least one of the multiple compensating mesh information.

7. The imaging device of claim 5, wherein the 3D image is with a frame rate required by a user.

8. The imaging device of claim 1, wherein the partial-feature may include at least one mouth shape feature of the object, and the mouth shape feature corresponds to the specific voice of the object, and the multiple compensating mesh information corresponding to the mouth shape feature is stored in the partial-feature database.

9. The imaging device of claim 1, wherein the 3D imaging module directly forms the 3D image based on the 3D mesh information of the object if a first rate of the imaging signal is greater than or equal to a frame rate required by the user.

10. The imaging device of claim 1, further comprising:
an image capturing module, which is electrically connected to the vision detecting module and captures the image of the object to generate the imaging signal;
a voice capturing module, which is electrically connected to the voice detecting module and captures the voice of the object to generate the voice signal; and
an image outputting module, which is electrically connected to the 3D imaging module and outputs the 3D image or performs subsequent image processing to the 3D image.

11. An imaging method using feature compensation, comprising:
generating a 3D mesh information of at least one object based on an imaging signal of the object, wherein the object has at least one partial-feature;
detecting at least one specific voice of the object based on a voice signal of the object, and thereby generating an ID information corresponding to the specific voice; and
selecting a plurality of compensating mesh information corresponding to the ID information from a partial-feature database, wherein the multiple compensating mesh information corresponds to the partial-feature, and combining the 3D mesh information of the object with at least one of the multiple compensating mesh information to form a 3D image, wherein the compensating mesh information, which is selected, is closest to a frame sequences in the imaging signal from the multiple compensating mesh information.

12. The imaging method of claim 11, further comprising:
outputting an ID signal, which contains the ID information corresponding to the at least one specific voice.

13. The imaging method of claim 11, wherein the 3D mesh information is a 3D mesh outputted after generating a 3D mesh information of at least one object based on an imaging signal of the object; and the 3D mesh information is received before the 3D imaging module combines the 3D mesh information of the object with at least one of the multiple compensating mesh information to form the 3D image.

14. The imaging method of claim 11, wherein the ID information corresponding to the specific voice is obtained by analyzing the ID signal before selecting the multiple compensating mesh information corresponding to the ID information from a partial-feature database.

15. The imaging method of claim 14, wherein the step of selecting the compensating mesh information from the partial-feature database, comprising:
storing the 3D mesh information and a time stamp corresponding to Hall the frame sequence in the imaging signal;
selecting the multiple compensating mesh information corresponding to the ID information from the partial-feature database; and
selecting at least one of the compensating mesh information, which is closest to the frame sequences in the imaging signal from the multiple compensating mesh information.

16. The imaging method of claim 15, wherein after combining the 3D mesh information of the object with at least one of the multiple compensating mesh information, further comprising:
inserting the 3D mesh information combined with the at least one of the multiple compensating mesh information into the frame sequence of the imaging signal to form the 3D image.

17. The imaging method of claim 16, wherein the 3D image is with a frame rate required by a user.

18. The imaging method of claim 11, wherein the partial-feature is at least one mouth shape feature of the object that corresponds to the specific voice of the object, and a plurality of compensating mesh information of the mouth shape feature is stored in the partial-feature database.

19. The imaging method of claim 18, wherein the specific voice corresponds to the voice of a single word.

20. The imaging method of claim 11, further comprising:
determining the relationship between a first rate of the imaging signal and a frame rate required by a user, and if the result of the determination is that the first rate is greater than or equal to the frame rate required by the user, then the 3D mesh information of the object is directly formed into the 3D image.

* * * * *